US 7,895,592 B2

(12) United States Patent
Subramanian et al.

(10) Patent No.: US 7,895,592 B2
(45) Date of Patent: Feb. 22, 2011

(54) PATCH IMPACT ANALYZER

(75) Inventors: Sowmya Subramanian, Mountain View, CA (US); Yum Yuen Sonny Wong, San Mateo, CA (US); George A. Buzsaki, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1477 days.

(21) Appl. No.: 11/089,665

(22) Filed: Mar. 24, 2005

(65) Prior Publication Data
US 2006/0130040 A1    Jun. 15, 2006

Related U.S. Application Data

(60) Provisional application No. 60/631,896, filed on Nov. 30, 2004.

(51) Int. Cl.
G06F 9/44 (2006.01)
(52) U.S. Cl. .................. 717/168; 717/100; 717/105
(58) Field of Classification Search ............. None
See application file for complete search history.

(56) References Cited

U.S. PATENT DOCUMENTS

| 5,960,206 | A * | 9/1999 | Barsness et al. | 717/174 |
| 6,334,196 | B1 * | 12/2001 | Smorodinsky et al. | 714/37 |
| 7,069,547 | B2 * | 6/2006 | Glaser | 717/154 |
| 7,496,912 | B2 * | 2/2009 | Keller et al. | 717/174 |
| 2003/0084063 | A1 * | 5/2003 | DelMonaco et al. | 707/103 R |
| 2003/0187967 | A1 * | 10/2003 | Walsh et al. | 709/223 |
| 2006/0080656 | A1 * | 4/2006 | Cain et al. | 717/174 |
| 2006/0117310 | A1 * | 6/2006 | Daniels et al. | 717/168 |

OTHER PUBLICATIONS

Ying et al, Predicting Source Code Changes by Mining Change History, IEEE Transactions on Software Engineering, Sep. 2004, vol. 30 No. 9, pp. 547-586, Retrieved on [Dec. 14, 2010] Retrieved from the Internet: URL<http://ieeexplore.ieee.org/stamp/stamp.jsp?tp=&arnumber=1324645>.*

* cited by examiner

Primary Examiner—Chameli C. Das
Assistant Examiner—Cheneca Smith
(74) Attorney, Agent, or Firm—Aka Chan LLP (57) ABSTRACT

Methods and apparatus for efficiently scheduling downtimes associated with installing updates to software applications are described. According to one aspect of the present invention, a method for accessing an impact of a portion of code, e.g., and update, on an application, includes obtaining metadata associated with the portion of code and comparing the metadata against a plurality of data structures associated with the application. Comparing the metadata against the data structures includes determining whether a first data structure is identified in the metadata. The method also includes creating a first list when the first data structure is identified in the metadata. The first list identifies the first data structure as being arranged to be substantially directly affected by the portion of code.

39 Claims, 7 Drawing Sheets

PATCH IMPACT ANALYZER

CROSS REFERENCE TO RELATED APPLICATION

The present invention claims priority of U.S. Provisional Patent Application No. 60/631,896, filed Nov. 30, 2004, which is incorporated herein in its entirety.

BACKGROUND OF THE INVENTION

1. Field of Invention

The present invention relates to software systems such as database systems. More specifically, the invention relates to efficiently evaluating the impact of a software update on a customer system prior to the implementation of the software update.

2. Description of the Related Art

Software providers often improve upon software applications which have been released. In order for customers who have purchased the software applications to benefit from the improvements developed by the software providers, the software providers often provide software updates to the customers. Software updates, which are often known as patches, typically contain code which is intended to be uploaded, e.g., uploaded by a customer, to augment software installed on a customer system. Such software updates generally include either or both code which is suitable for fixing a bug in the software installed on the customer system or code which provides new enhancements or upgrades to the software.

When a customer receives a software update, or receives notification that a software update is available for installation, the customer must schedule downtime during which the customer system on which software is installed is taken offline for purposes of installing the software update. The installation or implementation of the software update generally requires downtime for uptaking the software update and performing various tests on the software to ensure that the software is still functional after the uptaking of the software update. Since it is not known to the customer how the software update will affect his or her system, i.e., since the impact on his or her system is not known before the software update is uptaken, the customer generally schedules downtimes which may be far longer than is actually required. In other words, without knowledge of which files, components, business objects, or features associated with the customer instance of the software will likely be affected by the software update, the customer is forced to schedule a relatively long downtime in an effort to make certain that there will be more than sufficient time to uptake the software update, to restart the system after uptaking the software update, to recompile any files which are affected code after uptaking the software update, and to test the system after the software update is in place.

Any time there is downtime for a customer system, the cost of ownership for the customer system is increased. That is, any time a customer is unable to run his or her software due to the implementation of a software update, the customer may lose both time and money as any processes which utilize the system are halted while the software update is implemented. While scheduling a long downtime for a customer system due is effective to ensure that the installation of a software update is completed, when the actual number of files, components, business objects, or features impacted by the software update is small, the actual needed downtime may be significantly less than the scheduled downtime. By way of example, the amount of time needed for the uptake of a software update which impacts a small number of files and the amount of time needed to test the small number of files that are impacted by the software update may be relatively short compared to the scheduled downtime which is typically arranged to accommodate a scenario in which most files are impacted by a software update and most files need to be retested. As a result, a substantial portion of the scheduled downtime may actually be unnecessary in many cases.

In order to more accurately schedule downtime such that the scheduled downtime may be more likely to be close to the actual required downtime, some customers may attempt to manually estimate the amount of downtime that is likely to be required. Manually estimating a required downtime may involve studying the software update, and matching files in the software update to files of a customer system. In addition, customers may also have to manually speculate what components, business objects, and features would likely be affected by the software update. Any manual process of estimating a required downtime may be both time-consuming and error prone.

Therefore, what is needed is a method and an apparatus which enables an efficient scheduling of downtime to install a software update. That is, what is desired is a method and an apparatus which enables a customer to accurately and efficiently determine how much downtime to schedule for a software update by effectively estimating a potential impact of the software update prior to installing the software update using an automated process.

SUMMARY OF THE INVENTION

The present invention relates to efficiently scheduling downtimes associated with installing updates to software applications. According to one aspect of the present invention, a method for accessing an impact of a portion of code, e.g., and update, on an application, includes obtaining metadata associated with the portion of code and comparing the metadata against a plurality of data structures associated with the application. Comparing the metadata against the data structures includes determining whether a first data structure is identified in the metadata. The method also includes creating a first list when the first data structure is identified in the metadata. The first list identifies the first data structure as being arranged to be substantially directly affected by the portion of code.

In one embodiment, the method also includes obtaining dependency information that effectively identifies dependencies between the plurality of associated data structures, and comparing the first list with the dependency information. Comparing the first list with the dependency information may include determining when a second data has a dependency on the first data structure. In such an embodiment, when the second data structure is dependent on the first data structure, a second list which identifies the second data structure as being indirectly affected by the portion of code is created.

The efficiency with which software updates may be uptaken to a customer software application, or a customer instance of a software application, may be improved through the use of an impact analysis engine may be provided within a customer system. An impact analysis engine which uses information associated with the software update to determine an impact of the software update on the customer instance of the software application prior to installing the software update allows the amount of downtime which may be needed to process the software update to be scheduled based on an anticipated impact. Hence, the amount of scheduled downtime may effectively be optimized such that the amount of downtime provided is sufficient to install the software update, while the amount of downtime provided is not excessive.

According to another aspect of the present invention, a method for analyzing a software update, which includes at least one portion of code, associated with a software application having a plurality of associated data structures involves determining when at least a first data structure is arranged to be directly affected by the portion of code. The method also includes generating a direct impact list that identifies the first data structure as being directly affected by the portion of code when appropriate, and determining when at least a second data structure is indirectly affected by the portion of code. An indirect impact list that identifies the second data structure as being indirectly affected by the portion of code is generated if appropriate, and an amount of downtime to schedule for installing the portion of code relative to the software application using the direct impact list and the indirect impact list is determined.

In one embodiment, determining when the second data structure is indirectly affected by the portion of code may include determining when the second data structure is dependent on the first data structure. Determining when the second data structure is indirectly affected by the portion of code may also include determining when a navigation flow associated with the second data structure is affected by the portion of code.

According to another aspect of the present invention, a computer program product for assessing an impact of a portion of code on an application involves the application having a plurality of associated data structures, the portion of code having associated metadata that includes information associated with the portion of code, and the portion of code being arranged to be incorporated into the application. The computer program product includes: code devices that cause the portion of code to be obtained; code devices that cause the metadata to be compared with the plurality of associated data structures, where the code devices that cause the metadata to be compared with the plurality of associated data structures include code devices that cause a determination of determining whether a first data structure of the plurality of associated data structures is identified in the metadata; code devices that cause a first list to be created when the first data structure is identified in the metadata, the first list being arranged to identify at least the first data structure as being arranged to be substantially directly affected by the portion of code; and a computer-readable medium that stores the computer codes.

Other features and advantages of the invention will become readily available apparent upon review of the following description in association with the accompanying drawings, where the same or similar structures are designated with the same reference numerals.

BRIEF DESCRIPTION OF THE DRAWINGS

The invention may best be understood by reference to the following description taken in conjunction with the accompanying drawings in which.

DETAILED DESCRIPTION OF THE EMBODIMENTS

In the description that follows, the present invention will be described in reference to embodiments that utilize an impact analyzer for updates for a software application, such as a database-related application. However, embodiments of the invention are not limited to any particular architecture, environment, application, or implementation. For example, although embodiments will be described in reference to database applications, the invention may be advantageously applied to any software application. Therefore, the description of the embodiments that follows is for purposes of illustration and not limitation.

When a system is taken offline in order for software updates, e.g., patches or new files, to be installed on the system, processes running on the system are halted. Typically, downtime for the system is scheduled to accommodate the longest possible amount of time likely to be required for installing the software updates. That is, the downtime for the system is generally scheduled to account for the longest possible amount of time needed for the uptake of the software updates onto a customer system, the compilation of files affected by the software updates, and the testing of the customer system once the software updates are in place. When too much downtime is allocated, the costs associated with implementing the software update are high, as the system on which the software update is implemented is offline for longer than is necessary. In other words, when the amount of time needed to uptake a software update, compile files associated with the software update, and perform testing associated with the software update is significantly less than the amount of time that is allocated, software update is undertaken is effectively inefficiently processed.

To improve the efficiency with which software updates may be processed or installed, e.g., uptaken and tested, relative to a customer instance of a software application to which the software updates pertain, an impact analysis engine may be provided within a customer system. The impact analysis engine is arranged to use information associated with the software update to determine an impact of the software update on the customer instance of the software application prior to installing the software update. The ability to determine the impact of the software update allows the amount of downtime which may be needed to process the software update to be more accurately scheduled.

Figure 1:
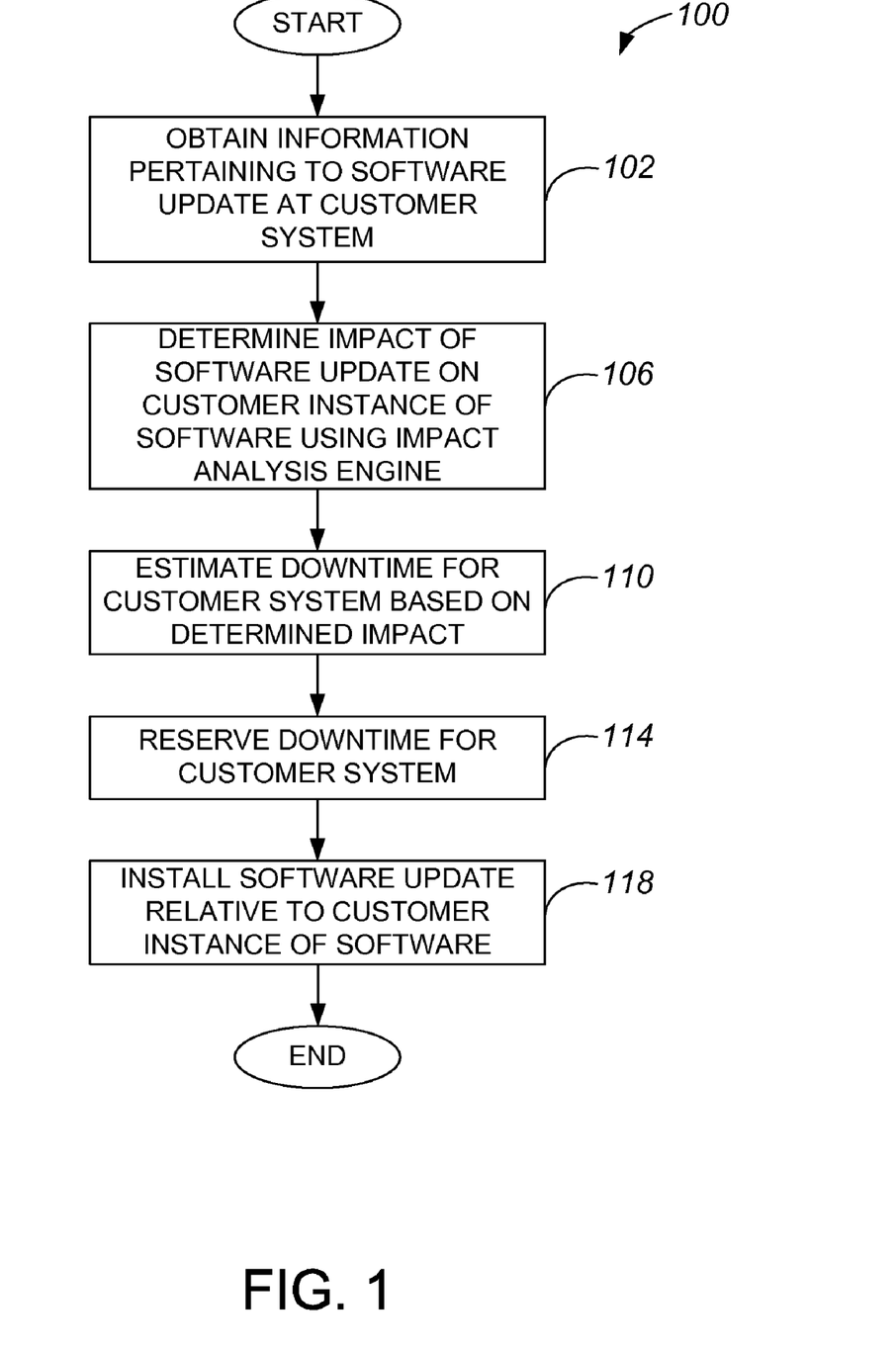
FIG. 1 is a process flow diagram which illustrates one method of processing a software update in accordance with an embodiment of the present invention.

FIG. 1 is a process flow diagram which illustrates one method of processing a software update which contains portions of code in accordance with an embodiment of the present invention. A process 100 of handling a software update begins at step 102 in which information pertaining to a software update for a software application is obtained by a customer system on which an instance of the software application is installed. In general, the software update may be any of a new release of the software application, files associated with new functionality for the software application, or a patch associated with the software application. The information pertaining to the software update may be information that is obtained by a customer with the software update from a source of the software update, or the information may be obtained separately from the actual software update. In the described embodiment, the information that pertains to the software update is obtained when the software update is obtained by the customer system, e.g., uploaded to the customer system, the source of the software update.

Once information pertaining to the software update is obtained at the customer system, the impact of the software update on the customer instance of the software application is determined using an impact analysis engine in step 106. The impact analysis engine is arranged to substantially automatically determine both the direct impact and the indirect impact of the software update on the customer instance of the software application. As will be discussed below with respect to FIG. 8, the impact analysis engine may cooperate with various analyzers to determine the impact of the software update. After the impact of the software update is determined, the downtime for the customer system is estimated based on the determined impact in step 110. Estimating the downtime for the customer system may include, but is not limited to, estimating an amount of time needed for the uptake of the software update, the amount of time needed to recompile files affected by the software update, and the amount of time needed to restart and to test the system after appropriate files have been recompiled. Estimating the downtime after the results of an impact analysis are known may either be a manual process or an automatic process.

In step 114, after the downtime is estimated for the customer system, the appropriate amount of downtime is reserved in step 114 for the customer system. Reserving downtime generally involves either automatically or manually determining a convenient time to take at least a part of the customer system offline, and effectively scheduling the downtime during the convenient time. Once the downtime is reserved, the software update is installed during the reserved downtime within the customer instance of the software application to which the software update applies in step 118, and the process of handling a software update is completed. It should be appreciated that the installation of a software update generally includes testing the customer instance of the software application once the software update is in place to ensure that the customer instance of the software application is functioning properly after the software update is in place.

Figure 2:
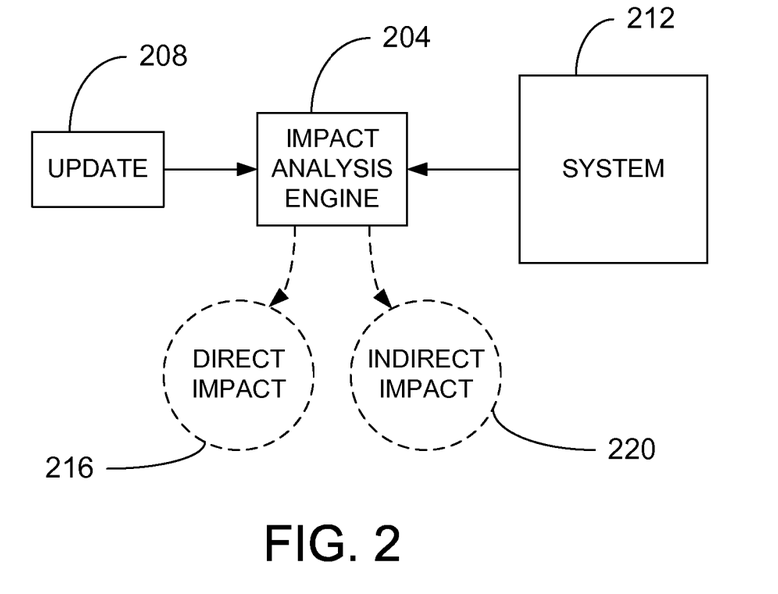
FIG. 2 is a diagrammatic representation of the functionality of an impact analysis engine in accordance with an embodiment of the present invention.

The impact of a software update on a customer instance of a software application prior to installation of the software update within the customer instance may be determined or otherwise assessed, through the use of an impact analysis engine, or comparison software, that is present on a customer system. An impact analysis engine generally compares a software update or, more specifically, files included in a software update, to files on a customer system in order to assess the impact of the software update. With reference to FIG. 2, the functionality of an impact analysis engine will be described in accordance with an embodiment of the present invention. An impact analysis engine 204 is arranged to obtain information update information 208 and customer system information 212. As will be described below with reference to FIG. 3, update information 208 may be obtained from a source of updates while customer system information 212 may be obtained from a customer database or repository. Using update information 208 and customer system information 212, both a direct impact 216 of an update on a customer system and an indirect impact 220 of the update on the customer system may be computed. A direct impact 216 refers to files, components, business objects, or features in a customer system which may be overwritten or otherwise altered by an update, whereas an indirect impact 220 refers to files, components, business objects, or features in the customer system which are not directly impacted by the update, but may be impacted because they reference or utilizes directly impacted files. For ease of discussion, although files, components, business objects, features and the like may all be impacted by an updated, files will generally be discussed. It should be appreciated that any discussion relating to files may be considered as also being applicable to components, business objects, features, and the like as appropriate. File dependencies may be such that files which are not directly affected by an update may be indirectly impacted and, hence may need to be recompiled once the update is installed. By way of example, when a child file is directly impacted by a software update, the corresponding parent file may be tested as the corresponding parent file may be considered to be indirectly impacted by the software update.

Figure 3:
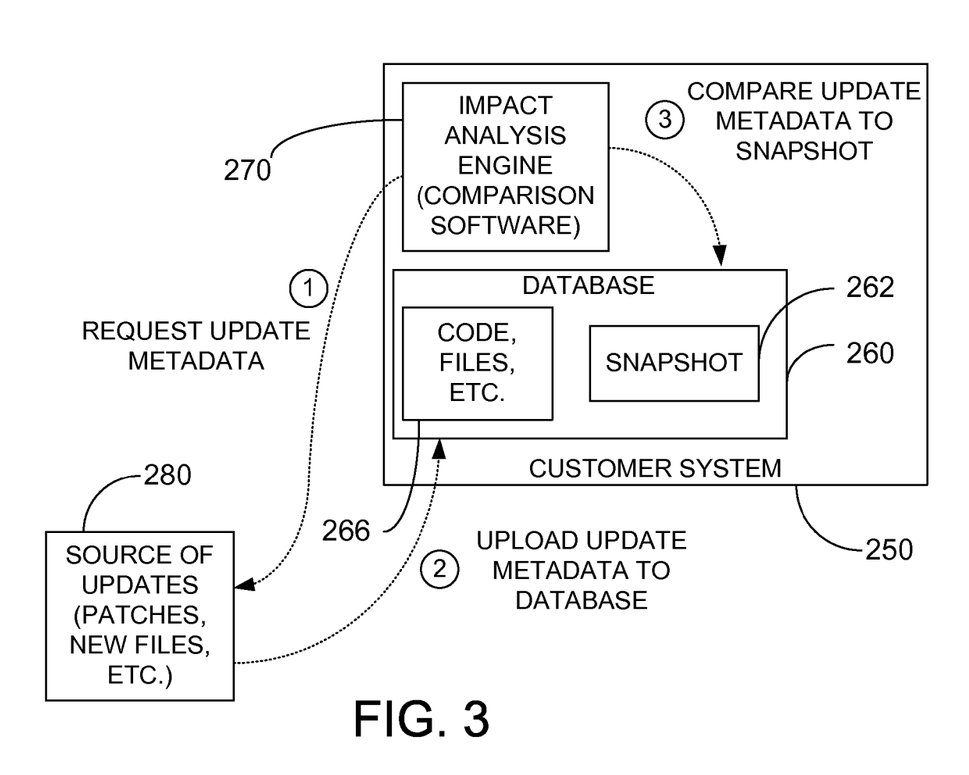
FIG. 3 is a diagrammatic representation of a process of comparing metadata of a software update to files stored in a repository of a customer system in accordance with an embodiment of the present invention.

Update information 208 is typically uploaded, but not installed, onto a customer system before impact analysis engine 204 processes update information 208. Update information 208 often includes metadata, i.e., update metadata, which has, but is not limited to, software patches and new files provided by a software vendor. FIG. 3 is a diagrammatic representation of a process of comparing metadata of a software update to files stored in a repository of a customer system in accordance with an embodiment of the present invention. A customer system 250, or a target system, generally includes a database 260 on which code 266, or files, associated with a customer instance of a software application may be stored. A "snapshot" 262 of customer system 250 may also be stored on database 260. Snapshot 262 is effectively a list or a metadata repository which tracks the files and metadata associated with customer system 250, and is updated such that snapshot 262 typically contains the most current listing of files and metadata within customer system 250.

An impact analysis engine 270, which is also included in customer system 250, is arranged to request metadata associated with an update from a source 280 of updates. As previously mentioned, source 280 may be a software provider. In one embodiment, source 280 may be an "advisor" application which essentially provides advice to customer system 250 in terms of updates which are recommended for customer system 250 and any pre-requisite updates associated with the recommended updates. Metadata associated with an update is often a manifest which includes metadata associated with a software update that has yet to be applied to customer system 250. After requesting the metadata associated with an update, the metadata may be uploaded to customer system 250, e.g., onto database 260. The metadata may generally be uploaded either with the files associated with an update, or separately from the files associated with an update. It should be appreciated that in some instances, rather than requesting metadata associated with an update, metadata associated with an update may substantially automatically be uploaded onto customer system 250 once notification that an update is available is received by customer system 250.

Once metadata associated with an update is uploaded to customer system 250, impact analysis engine 270 compares the metadata associated with the update to snapshot 260. Such a comparison generally enables a determination of which code 266 is either directly or indirectly affected by an update, and may be performed using analyzers (not shown) associated with the impact analysis engine. Since the metadata associated with an update is typically a file list, impact analysis engine 270 may perform a comparison between the file list of the metadata associated with an update and the file list included in snapshot 260. Although metadata associated with an update is typically a file list, it should be appreciated that metadata associated with an update is not limited to being only a file list. By way of example, the metadata may include other metadata associated with the update, such as pre-computed dependency relationships between different objects in the update.

Figure 4:
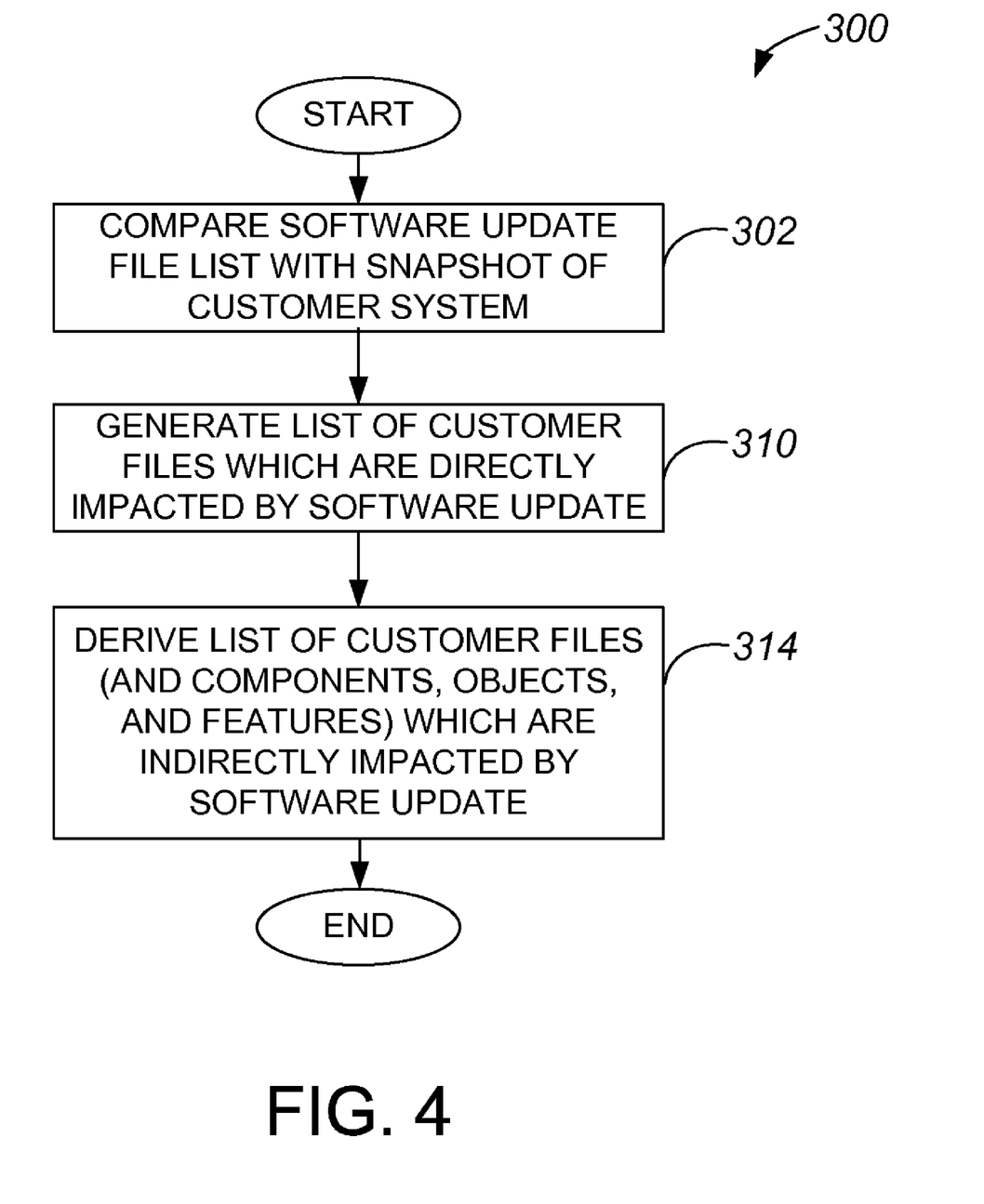
FIG. 4 is a process flow diagram which illustrates one method of creating file impact lists in accordance with an embodiment of the present invention.

A list or lists of files, e.g., customer files or files associated with a customer instance of a software application, that are impacted by a software update may be generated by impact analysis engine 270. As previously mentioned, a list of files may also include components, business objects, and features. With reference to FIG. 4, one method of creating file impact lists, or lists of files which are impacted by a software update, will be described in accordance with an embodiment of the present invention. A process 300 of creating file impact lists begins at step 302 in which a software update file list, i.e., metadata associated with an update, is compared with a snapshot of a customer system using an impact analysis engine. Such a comparison may be performed using any suitable method, in step 310, a list of customer files which are directly impacted by the update is generated. The steps associated with one method of generating the list of directly impacted customer files will be described below with respect to FIG. 5. Generating a list of directly impacted customer files typically includes determining which new files will be imported to the customer system through an update, and which existing customer files will be overwritten by files included in the update. That is, files which will be directly affected or will be altered by the update are effectively identified.

After a list of directly impacted customer files is generated, a list of indirectly impacted customer files, i.e., a list of customer files which are indirectly impacted by the update, is generated in step 314. One method of generating a list of indirectly impacted files will be discussed below with respect to FIG. 5. In some instances, Java Service Pages (JSPs) in the customer system are parsed to ascertain dependency relationships between files, thereby enabling JSPs that are indirectly affected by the update to be identified. In other instances, Java classes, PL/SQL packages, C files, and database objects may also be studied to ascertain dependency relationships. Upon generating a list of indirectly impacted files, the process of creating file impact lists is completed.

Figure 5:
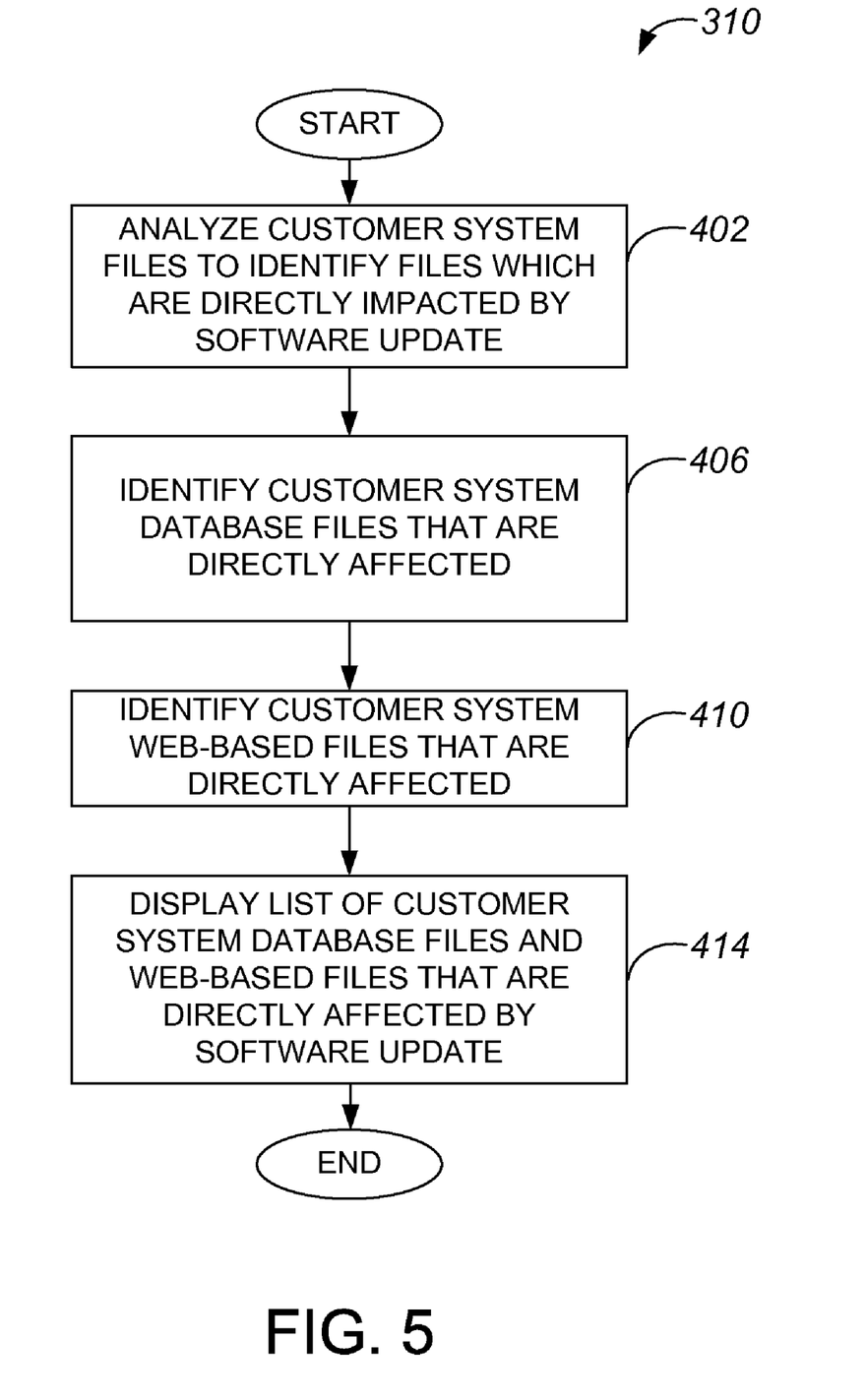
FIG. 5 is a process flow diagram which illustrates one method of generating a list of customer instance files which are directly impacted by a software update, i.e., step 310 of FIG. 4, in accordance with an embodiment of the present invention.

FIG. 5 is a process flow diagram which illustrates one method of generating a list of customer instance files which are directly impacted by a software update, i.e., step 310 of FIG. 4, in accordance with an embodiment of the present invention. A process 310 of generating a list of directly impacted files begins at step 402 in which the customer system files, which may include files stored on a database and web-based files associated with the customer system, are analyzed to identify files which are directly impacted by an update. As previously mentioned, files which are directly impacted by an update include files which are arranged to be overwritten during the course of applying a software update.

Any customer system database files that are directly affected by the software update are identified in step 406, and the customer system web-based files that are directly affected are identified in step 410. It should be appreciated that identified files are not limited to being customer system database files. By way of example, files may be files which affect any part of the customer system including, but not limited to, mid-tier logic files, user interface presentation files, database logic files, database schema files, and seed data files. For common files that are present in both the customer system and the software update, the version numbers of the files in the customer system and the software update may be checked to determine if the files in the software update would overwrite the files in the customer system. As will be appreciated by those skilled in the art, if a given file in the software update is effectively newer than a corresponding file in the customer system, the file in the customer system is directly affected by the file in the software update because the file in the customer system would be overwritten when the software update is applied.

Once files that are directly affected by the software update are identified, process flow moves to step 414 in which a list of customer system files, as for example customer system database files and customer system web-based files, that are directly affected by the software update, or a list of directly impacted files, are displayed, e.g., to a system administrator of the customer system. A display of the list of directly impacted files may group and summarize the files such that the system administrator may readily assess the impact of the software update. One the list of directly impacted files is displayed, the process of generating the list of directly impacted files is completed.

Figure 6:
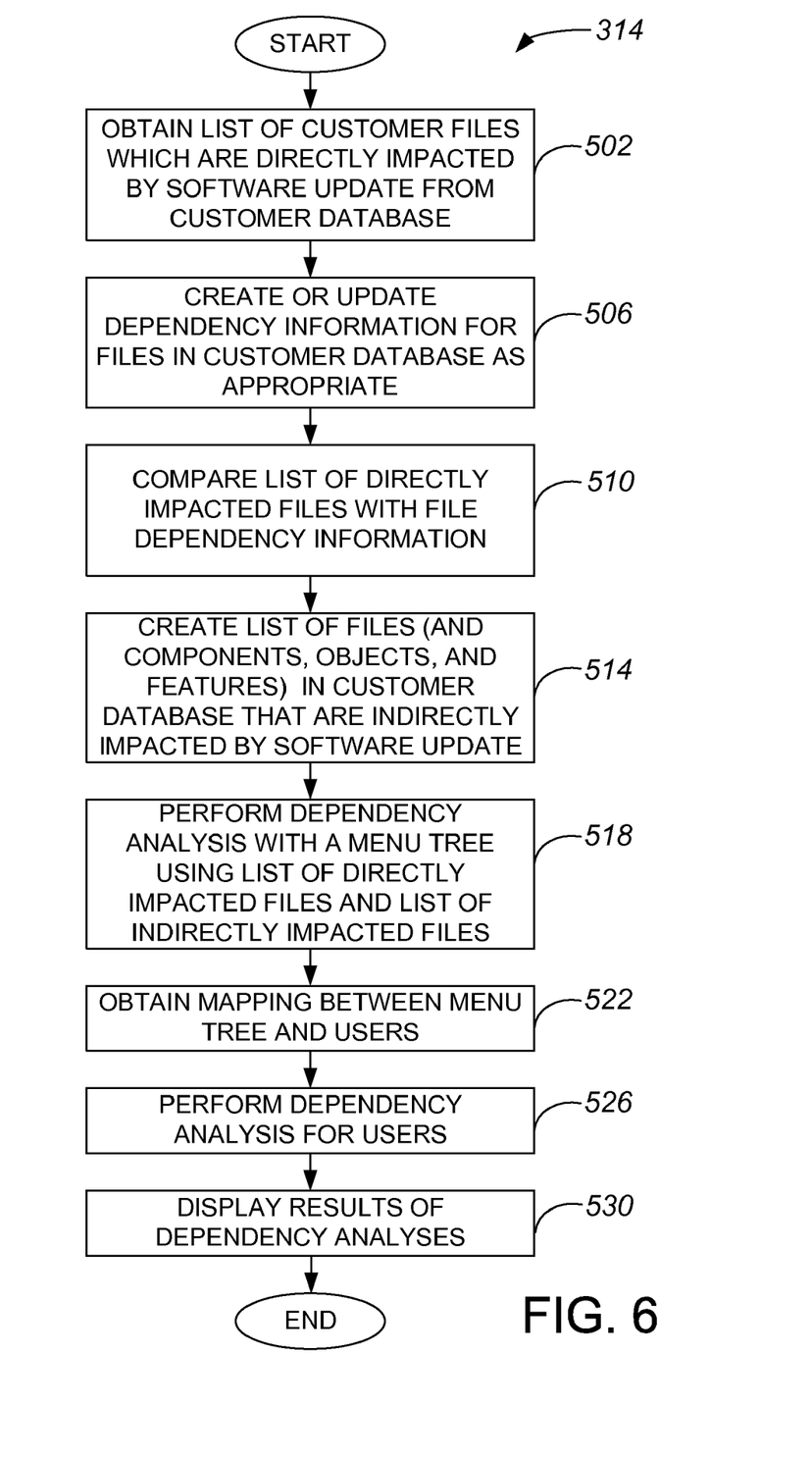
FIG. 6 is a process flow diagram which illustrates one method of deriving a list of customer instance files which are indirectly impacted by a software update, i.e., step 314 of FIG. 4, in accordance with an embodiment of the present invention.

Referring next to FIG. 6, one method of deriving a list of customer instance files which are indirectly impacted by a software update, i.e., step 314 of FIG. 4, will be described in accordance with an embodiment of the present invention. A process 314 of deriving a list of files which are indirectly impacted or affected by a software update begins at step 502 in which a list of customer files which are directly impacted by the software update is obtained. In one embodiment, the list is updated from a customer database in which it is stored after being created.

Once the list of directly impacted files is obtained, then in step 506, dependency information for files is created or updated, as appropriate, in a customer database. It should be appreciated that if there is no dependency information for files stored in the customer database, the dependency information is created and stored. Alternatively, if there is dependency information for files stored in the customer database, the dependency information may be updated if it is determined that some dependencies may have changed. The dependency information may involve, for example, information which identifies parent files and their dependent files.

From step 506, process flow moves to step 510 in which the list of directly impacted files is compared to the file dependency information. Such a comparison generally enables any files which are dependent on files included in the list of directly impacted files to be identified as being indirectly impacted by a software update. By way of example, if a child file is identified as being directly impacted by a software update, a parent file of the child file as identified in the file dependency information is typically indirectly impacted by the software update.

After the comparison is made in step 510 between the list of directly impacted files and the file dependency information, a list of files that are indirectly impacted by the software update is created in step 514. That is, a list of indirectly impacted files is created based on the comparison of step 510. The list of indirectly impacted files may include, but is not limited to, JSPS, PL/SQL objects, C object files, and Java files.

In step 518, a dependency analysis is performed with a menu tree using the list of directly impacted files and the list of indirectly impacted files. Performing a dependency analysis typically involves analyzing the files included in the list of directly impacted files and the files included in the list of indirectly impacted files to determine which files, if any, appear in a menu tree of a customer instance of a software application. In one embodiment, a snapshot of the menu tree structure may be stored in a customer database. A dependency analysis also involves identifying applications and responsibilities which are impacted when the files, i.e., files which are either directly impacted or indirectly impacted by the software update, are updated and recompiled, as well as identifying users associated with the responsibilities and identifying menu navigation paths the users are likely to take to access the impacted responsibilities.

In one embodiment, dependency analysis is performed by parsing files and querying data from database schema in order to identify objects, components, and features which may be indirectly impacted by files that are overwritten by a software update. A list of substantially all objects, components, features, and files that are indirectly impacted may then be summarized and displayed to a customer system administrator to pinpoint areas of which may benefit from retesting. Such a list may also be used to determine a substantially exact downtime needed to accommodate the software update.

Once a dependency analysis is performed with a menu tree, a mapping between the menu tree and users is obtained in step 522. The mapping generally includes menu navigation paths users utilize to access applications and responsibilities which are affected by the software update. Hence, the mapping allows a system administrator to narrow paths which are to be tested once the software update is in place, and allow regression testing to be more efficiently planned. Upon obtaining the mapping between the menu tree and the users, a dependency analysis is then performed for the users of the customer instance of the software application in step 526. Such a dependency analysis may involve looking up a table of users, as for example a table stored on a customer database, to identify any users who have dependencies associated with users whose menu navigation paths were identified in step 518.

After the dependency analysis is performed for the users in step 526, the results of the various dependency analyses are displayed to a system administrator in step 530. In one embodiment, the results are displayed as an overall list which includes files that are indirectly affected by the software update, as the results include files, navigation flows, and users which are effectively affected, albeit indirectly, by the software update. Any files which are included in the navigations paths of users who access affected files may also be included in the list. After results of the dependency analyses are displayed, the process of deriving a list of files which are indirectly impacted or affected by a software update is completed. The dependency analyses may include substantially any type of dependency analyses for navigation paths, as well as dependency analyses for files, objects components, and feature dependencies.

Figure 7:
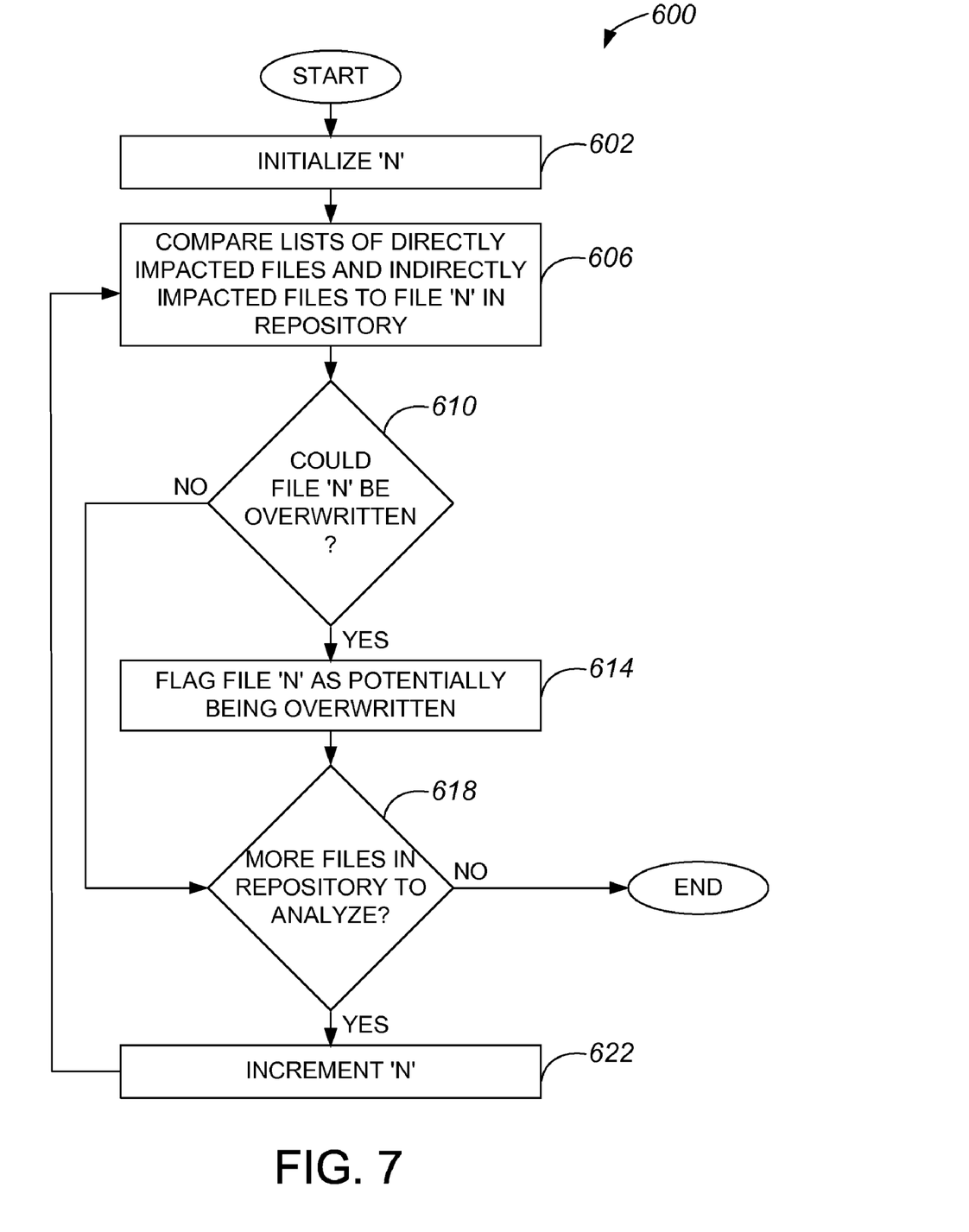
FIG. 7 is a process flow diagram which illustrates one method of identifying customized files which may be overwritten by a software update in accordance with an embodiment of the present invention.

Some customers may customize files associated with their instances of software applications. Since software updates may include files which are arranged to overwrite the customized files, the ability for the customers to readily determine which customized files may be overwritten would enable the customers to either decide not to install a software update or to identify which updated files may need to be customized after an update is installed. With reference to FIG. 7, one method of identifying customized files which may be overwritten using an impact analysis engine will be described in accordance with an embodiment of the present invention. A process 600 of identifying customized files which may be overwritten due to a software update begins at step 602 in which a counter 'N' is initialized. Once counter 'N' is initialized, file 'N' is obtained from a customer repository or database in step 606, and it is determined whether file 'N' appears in either a list of files that are directly impacted by a software update of a list of files that are indirectly impacted by the software update. That is, it is determined whether file 'N' is a file which is impacted by the software update.

A determination is made in step 610 regarding whether file 'N' may be overwritten by the software update. If it is determined that file 'N' may be overwritten by the software update, file 'N' is flagged as potentially being overwritten in step 614. Flagging file 'N' may involve storing an indicator in the customer repository or database which identifies file 'N' as potentially being overwritten.

After file 'N' is flagged in step 614, or if it is determined in step 610 that file 'N' is not likely to be overwritten by the software update, process flow moves to step 618 in which it is determined if there are more files in the repository or database to analyze. If the determination is that there are no more files to analyze, the indication is that all files in the repository which may potentially be overwritten by the software update have been flagged. As such, when it is determined that there are no more files to analyze, the process of identifying customized files which may be overwritten due to a software update is completed.

Alternatively, if it is determined in step 618 that there are more files in the repository to analyze, then in step 622, counter 'N' is incremented. Once counter 'N' is incremented, process flow returns to step 606 in which file 'N' is compared to the list of files that is directly impacted by the software update and to the list of files that is indirectly impacted by the software update.

Figure 8:
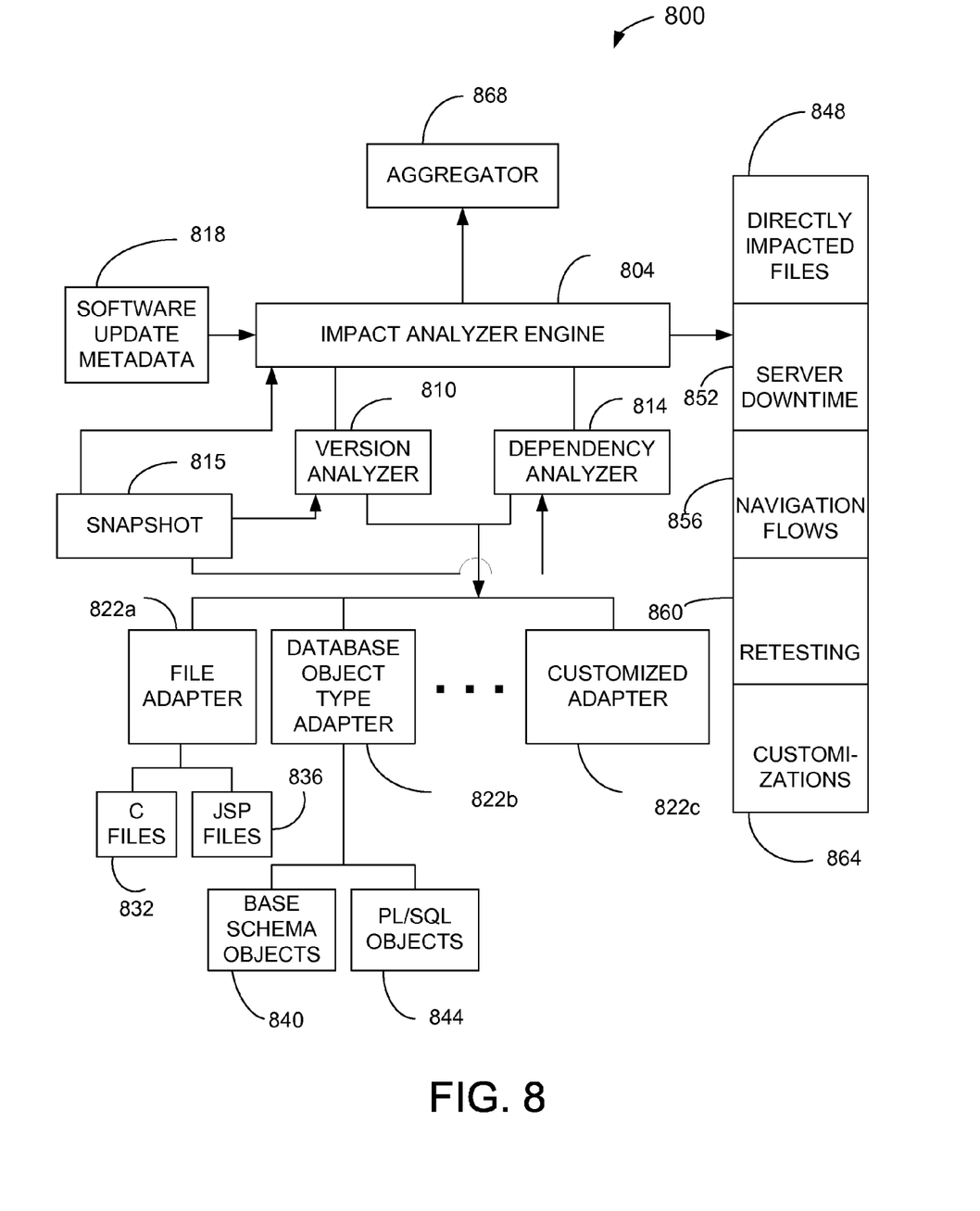
FIG. 8 is a diagrammatic representation of a framework suitable for analyzing a software update to determine an impact of the software update on a customer instance in accordance with an embodiment of the present invention.

The overall architecture of a framework which supports an impact analysis or analyzer engine may vary depending, for instance, on the requirements of a system on which the impact analysis engine is used. FIG. 8 is a diagrammatic representation of a framework suitable for analyzing a software update to determine an impact of the software update on a customer instance in accordance with an embodiment of the present invention. A framework 800, which is typically implemented as code devices within a system that supports a software application which supports updates, includes an impact analysis engine 804, or an impact analyzer engine which processes metadata 818 associated with an update to determine an impact of the update on the software application.

A version analyzer 810 is arranged to compare versions of files, namely versions of files associated with the system and versions of files associated with metadata 818 to ascertain which files associated with the system are directly impacted by the update. A dependency analyzer 814 is arranged to identify files which are indirectly impacted by the update, as well as to perform dependency analyses associated with a menu tree and with users. Dependency analyzer 814 may also be arranged to identify dependencies between files, business objects, components, and features. A snapshot 815 may generally be provided as an input to impact analysis engine 804, version analyzer 810, and dependency analyzer 814.

Adapters 822a-c, which are typically pluggable, are arranged to facilitate the analysis of various types of files by version analyzer 810 and dependency analyzer 814. The pluggability of adapters 822a-c enables adapters 822a-c to be efficiently interchanged, or removed and added, as needed. Further, any time a new file or object-type is to be supported by framework 800 such that impact analysis engine 804 may process the new file or object-type, a new adapter 822a-c may be incorporated.

In the described embodiment, adapters 822a-c include, but are not limited to, a file adapter 822a, a database object-type adapter 822b, and a customized adapter 822c. File adapter 822a is arranged to enable version analyzer 810 and dependency analyzer 814 to process files such as C files 832 and JSP files 836. C files 832 and JSP files 836 may be stored in a database or a repository. Database object-type adapter 822b is arranged to enable version analyzer 810 and dependency analyzer 814 to process database objects such as base schema objects 840 and PL/SQL objects 844. Customized adapter 822c is arranged to process any custom files, objects, or data structures which a customer may wish to process using version analyzer 810 and dependency analyzer 814. Such custom files, objects, and data structures may generally include any suitable file types and object types such as forms, Java Classes, seed data, etc. that either a software update includes or that a customer system utilizes.

An aggregator 868 enables the impact of substantially all changes associated with an update or updates to be aggregated. Aggregator 868 may aggregate changes such that retesting of the same component that is affected by changes occurs once instead of multiple times. In other words, aggregator 868 determines when a particular component, e.g., file or object, is impacted by multiple changes, and prevents retesting of the particular component separately in response to each change. The use of aggregator 868 effectively allows testing to occur efficiently, without the need for a system administrator to manually aggregate any changes.

Impact analyzer engine 804 is in communication with various modules. A directly impacted files module 848 is arranged to create a list of directly impacted files based on output from version analyzer 810. A server downtime 852 module is arranged to estimate an amount of downtime that is needed to install a software update. A navigation flows module is 856 is arranged to assess paths which a user may use to access particular files or responsibilities, as for example paths needed to access files or responsibilities affected by a software update, and may utilize output of dependency analyzer 814 to determine the paths. A retesting module 860 may be used to located diagnostics tests which are intended to be run to test files impacted by a software update. A customizations module 864 is arranged to flag customized files which may be affected by a software update. Navigation flows module 856, retesting module 860, and customizations module 864 are associated with indirectly impacted files, while server downtime module 852 is associated with both directly impacted files 848 and indirectly impacted files.

Although only a few embodiments of the present invention have been described, it should be understood that the present invention may be embodied in many other specific forms without departing from the spirit or the scope of the present invention. While a comparison of files has generally been described as determining whether files are impacted by a software update, substantially any type of object may also be impacted by a software update. Hence, the systems and steps described above that are suitable for use in determining the effect of updates on files are also application for use in determining the effect of updates on objects.

Additionally, other data structures, i.e., data structures other than files or objects, may also be processed in the course of assessing an impact of a software update on an instance of application. By way of example, when an instance of an application has tables which may potentially be updated through a software update, an impact analysis engine may be arranged to assess the impact of the software update on any tables associated with the instance of the application.

While the impact of a software update on a customer instance of a software application has generally been described in terms of the impact on files, a software update also impacts various components, features, business objects, and the like associated with the customer instance. The various discussions of impact analyses based on files and objects is also generally applicable to various other data structures including, but not limited to, components, features, and business objects.

A version analyzer and a dependency analyzer have been described as being in communication with various adapters to access files and objects associated with a customer system. In one embodiment, the version analyzer and the dependency analyzer may be arranged to have substantially direct access to the files and the objects, i.e., the functionality associated with the adapters may be provided in the version analyzer and the dependency analyzer. Further, it should be understood that since a snapshot if the files and objects associated with a customer system is typically available, while the version analyzer and the dependency analyzer may be able to access files and objects of the customer system, the version analyzer and the dependency analyzer may access the snapshot in lieu of the files and objects during an impact analysis process.

Lists have generally been described as being created such that there is one list which identifies files that are directly impacted by a software update and another list which identifies files that are indirectly impacted by the software update. It should be appreciated, however, that rather than maintaining separate lists, a single list may be created. That is, a single list may be arranged to identify substantially all files which are impacted in any way, e.g., either directly or indirectly, by a software update.

While the present invention has been described as being suitable for automatically determining the downtime needed to accommodate a software update, the present invention is also applicable for other purposes relating to a software update. By way of example, the present invention is suitable for use in substantially automatically pinpointing areas of a customer instance which should be tested after a software update is installed, substantially automatically identifying servers which may need to be brought down during a software update, substantially automatically determining which languages may be impacted on a customer system, substantially automatically identifying features and components that are impacted on the customer system, and substantially automatically identifying any users, roles, or applications that are directly impacted in the customer system.

An impact analysis engine is generally arranged such that it may obtain data from a variety of different sources. That is, an impact analysis engine may obtain data for use in performing impact and dependency analysis from substantially any suitable data structure. Suitable data structures include, but are not limited to, data structures which include software update metadata and data structures which supply customer system snapshots or dependency information. It should be appreciated that the overall architecture which includes an impact analysis engine is such that with only insubstantial changes to the impact analysis engine, various other data structures may be used to provide data to the impact analysis engine.

In general, the steps associated with methods of the present invention may vary widely. Steps may be added, removed, altered, and reordered without departing from the spirit or the scope of the present invention. For example, in lieu of displaying results such as lists of files impacted by a software update to a system administrator, the results may instead be written to a file and stored in a repository where the results are accessible to the system administrator. Therefore, the present examples are to be considered as illustrative and not restrictive, and the invention is not to be limited to the details given herein, but may be modified within the scope of the appended claims.

What is claimed is:

1. A method for assessing an impact of a portion of code on an application, the application having a plurality of associated data structures, the portion of code having associated metadata that includes information associated with the portion of code, the portion of code being arranged to be incorporated into the application, the method comprising:
obtaining the metadata that includes the information associated with the portion of code;
comparing the metadata with the plurality of associated data structures, wherein comparing the metadata with the plurality of associated data structures includes determining whether a first data structure of the plurality of associated data structures is identified in the metadata;
creating a first list when the first data structure is identified in the metadata, the first list being arranged to identify at least the first data structure as being arranged to be substantially directly affected by the portion of code;
determining whether a second data structure of the plurality of associated data structures is identified in the metadata, wherein the second data structure has a dependency on the first data structure, and the first list does not identify the second data structure;
without installing the portion of code, calculating an estimated amount of downtime for installing the portion of code on the application, wherein the calculating an estimated amount of downtime includes utilizing at least the first list to determine the estimated amount of downtime;
creating a second list when the second data structure is determined to have a dependency on the first data structure, the second list being arranged to identify at least the second data structure as being arranged to be substantially indirectly affected by the portion of code;
determining when a third data structure of the plurality of data structures is arranged to be overwritten by the portion of code, the third data structure being a customized data structure associated with the application, wherein determining when the third data structure is arranged to be overwritten by the portion of code includes comparing the first list and the second list with the third data structure; and
flagging the third data structure as being arranged to be overwritten by the portion of code when it is determined that the third data structure is arranged to be overwritten by the portion of code.

2. The method of claim 1 wherein the portion of code includes an update associated with the first data structure.

3. The method of claim 1 wherein the data structures include at least one of a C file, a Java Service Pages (JSP) file, a base schema object, and a Procedural Language/Structured Query Language (PL/SQL) object.

4. The method of claim 1 wherein data structure metadata associated with the plurality of data structures is arranged in a repository, and comparing the metadata with the plurality of data structures includes obtaining the data structure metadata and comparing the metadata with the data structure metadata.

5. The method of claim 1 wherein the comparing the metadata with the plurality of associated data structures is performed on the computer where the application resides.

6. A method for assessing an impact of a portion of code on an application, the application having a plurality of associated data structures, the portion of code having associated metadata that includes information associated with the portion of code, the portion of code being arranged to be incorporated into the application, the method comprising:
obtaining the metadata that includes the information associated with the portion of code;
comparing the metadata with the plurality of associated data structures, wherein comparing the metadata with the plurality of associated data structures includes determining whether a first data structure of the plurality of associated data structures is identified in the metadata;
creating a first list when the first data structure is identified in the metadata, the first list being arranged to identify at least the first data structure as being arranged to be substantially directly affected by the portion of code;
before the portion of code is incorporated into the application, obtaining dependency information, the dependency information being arranged to indicate dependencies between the plurality of associated data structures;
comparing the first list with the dependency information, wherein the comparing the first list with the dependency information includes determining when a second data structure of the plurality of data structures has a dependency on the first data structure, and the second data structure is not in the first list;
creating a second list when the second data structure is determined to be dependent on the first data structure, the second list being arranged to identify at least the second data structure as being arranged to be substantially indirectly affected by the portion of code;
determining when a third data structure of the plurality of data structures is arranged to be overwritten by the portion of code, the third data structure being a customized data structure associated with the application, wherein determining when the third data structure is arranged to be overwritten by the portion of code includes comparing the first list and the second list with the third data structure; and
flagging the third data structure as being arranged to be overwritten by the portion of code when it is determined that the third data structure is arranged to be overwritten by the portion of code.

7. The method of claim 6 wherein the portion of code includes an update associated with the first data structure.

8. The method of claim 6 comprising:
determining whether a first navigation flow associated with the application is arranged to be affected by the portion of code; and
adding information associated with the first navigation flow to the second list when it is determined that the first navigation flow is arranged to be affected by the portion of code.

9. The method of claim 6 wherein the data structures include at least one of a C file, a Java Service Pages (JSP) file, a base schema object, or a Procedural Language/Structured Query Language (PL/SQL) object.

10. The method of claim 6 comprising:
without installing a first update to the application, estimating a downtime for the application, wherein the estimating comprises utilizing at least the first list to determine an amount of time associated with installing the first update with respect to the application.

11. The method of claim 6 wherein the second list is created from the first list.

12. The method of claim 6 wherein the second list does not exist before the creating a first list.

13. The method of claim 6 comprising:
recompiling a file listed in the second list, but not listed in the first list.

14. The method of claim 6 comprising:
analyzing whether files included in the first and second list appear in a menu tree of an instance of the application.

15. The method of claim 14 comprising:
mapping between the menu tree and users, wherein the mapping comprises identifying menu navigation paths users utilize to access the application and responsibilities which are directly and indirectly affected by the portion of code;
looking up a table of the users to identify any users who have dependencies associated with users whose menu navigation paths were identified; and
displaying the results, wherein the results comprise the first list, second list, navigation paths, and users affected by the portion of code to be incorporated into the application.

16. The method of claim 6 comprising:
before installing a first update to the application, estimating a downtime for the application, wherein the estimating comprises estimating an amount of time for the portion of code to be incorporated into the application and estimating an amount of time to recompile files affected by the portion of code.

17. The method of claim 16 comprising:
reserving the downtime to install the portion of code, wherein the reserving comprises determining a convenient time to install the portion of code;
scheduling the downtime during the convenient time; and
after scheduling the downtime, installing the portion of code during the downtime.

18. The method of claim 6 wherein the second data structure is not directly affected by the portion of code.

19. The method of claim 6 wherein the second data structure references a data structure in the first list.

20. A system, embodied using computer-readable medium, being arranged to process a portion of code that is arranged to be installed on an application having a plurality of data structures, the portion of code having associated metadata that includes information associated with the portion of code, the system comprising:
an engine arrangement, the engine arrangement being arranged to obtain the portion of code and to access at least one of a first analyzer arrangement a second analyzer arrangement, and a third analyzer arrangement;
the first analyzer arrangement, the first analyzer arrangement being arranged to compare the portion of code to information associated with the plurality of data structures to determine which data structures of the plurality of data structures are arranged to be directly impacted by the portion of code, the first analyzer arrangement further being arranged to generate a first list, the first list being arranged to identify the data structures of the plurality of data structures that are arranged to be directly impacted by the portion of code;
the second analyzer arrangement, the second analyzer arrangement being arranged to compare the first list to the plurality of data structures to determine which data structures of the plurality of data structures are arranged to be indirectly impacted by the portion of code, the second analyzer arrangement further being arranged to generate a second list based on the first list, the second list being arranged to identify the data structures of the plurality of data structures that are arranged to be indirectly impacted by the portion of code before the portion of code is installed on the application, and the first list is different from the second list; and
the third analyzer arrangement, the third analyzer arrangement being arranged to determine when a third data structure of the plurality of data structures is arranged to be overwritten by the portion of code and flagging the third data structure as being arranged to be overwritten by the portion of code when it is determined that the third data structure is arranged to be overwritten by the portion of code, the third data structure being a customized data structure associated with the application, wherein determining when the third data structure is arranged to be overwritten by the portion of code includes comparing the first list and the second list with the third data structure.

21. The system of claim 20 comprising:
a scheduler, the scheduler being arranged to determine an amount of time needed to install the portion of code into the application based on the first list and the second list without installing the portion of code.

22. The system of claim 20 wherein the data structures that are arranged to be indirectly impacted are not altered by the portion of code.

23. The system of claim 20 comprising:
a software update arrangement, the software update arrangement being arranged to recompile a file listed in the second list, but not listed in the first list.

24. A system, embodied using computer-readable medium, being suitable for analyzing a software update associated with a software application, the software update including at least one portion of code, the software application having a plurality of associated files, the system comprising:
an impact analysis arrangement, the impact analysis arrangement being arranged to create a file impact list, the file impact list being arranged to identify at least one file impacted by the at least one portion of code associated with the software application without installing the at least one portion of code relative to the software application;
wherein the impact analysis arrangement is arranged to determine the file impact list by comparing the at least one portion of code to information associated with the plurality of associated files to identify a first set of files of the plurality of associated files that are arranged to be directly altered by the at least one portion of code, and
the plurality of associated files includes a first customized file, and the impact analysis arrangement is arranged to flag the first customized file as being arranged to be directly altered by the at least one portion of code when the first customized file is included in the first set; and
a first module, the first module being arranged to process the file impact list to determine an amount of time associated with installing the at least one portion of code relative to the software application and testing an instance of the application prior to installing the at least one portion of code.

25. The system of claim 24 wherein the files include at least one of a C file and a Java Service Pages (JSP) file.

26. The system of claim 24 wherein the impact analysis arrangement is further arranged to determine the impact by identifying a second set of files of the plurality of associated files that are dependent on the first set of files, the second set of files being arranged to be indirectly affected by the at least one portion of code.

27. The system of claim 24 wherein the amount of time associated with installing the at least one portion of code relative to the software application includes an amount of time needed to recompile files directly altered by the at least one portion of code.

28. A computer program product for assessing an impact of a portion of code on an application, the application having a plurality of associated data structures, the portion of code having associated metadata that includes information associated with the portion of code, the portion of code being arranged to be incorporated into the application, the computer program product comprising:
    code devices that cause the portion of code to be obtained;
    code devices that cause the metadata to be compared with the plurality of associated data structures, wherein the code devices that cause the metadata to be compared with the plurality of associated data structures include code devices that cause a determination of determining whether a first data structure of the plurality of associated data structures is identified in the metadata;
    code devices that cause a first list to be created when the first data structure is identified in the metadata, the first list being arranged to identify at least the first data structure as being arranged to be substantially directly affected by the portion of code;
    code devices that cause dependency information to be obtained, the dependency information being arranged to indicate dependencies between the plurality of associated data structures;
    code devices that cause the first list to be compared with the dependency information, wherein the code devices that cause the first list to be compared with the dependency information include code devices that cause a determination of when a second data structure of the plurality of data structures has a dependency on the first data structure;
    code devices that cause a second list to be created based on the first list when the second data structure is determined to be dependent on the first data structure, the second list being arranged to identify at least the second data structure as being arranged to be substantially indirectly affected by the portion of code;
    when a third data structure of the plurality of data structures is arranged to be overwritten by the portion of code, code devices that cause a third data structure of the plurality of data structures to be overwritten by the portion of code, the third data structure being a customized data structure associated with the application, wherein determining when the third data structure is arranged to be overwritten by the portion of code includes comparing the first list and the second list with the third data structure;
    code devices that cause the third data structure to be flagged as being arranged to be overwritten by the portion of code when it is determined that the third data structure is arranged to be overwritten by the portion of code; and
    a computer-readable medium that stores the computer codes.

29. The computer program product of claim 28 comprising:
    before incorporating a first code update into the application, code devices that cause estimating an offline time amount for the application, wherein estimating the offline time amount for the application includes utilizing at least the first data structure in the first list to determine an amount of time associated with installing the first code update.

30. The computer program product of claim 28 wherein the portion of code comprises an update associated with the first data structure.

31. The computer program product of claim 28 comprising:
    code devices that cause a determination of whether a first navigation flow associated with the application is arranged to be affected by the portion of code; and
    code devices that cause information associated with the first navigation flow to be added to the second list when it is determined that the first navigation flow is arranged to be affected by the portion of code.

32. The computer program product of claim 28 wherein the data structures include at least one of a C file, a Java Service Pages (JSP) file, a base schema object, and a Procedural Language/Structured Query Language (PL/SQL) object.

33. The computer program product of claim 28 comprising:
    code devices that cause recompiling of a file listed in the second list, but not listed in the first list.

34. A method for analyzing a software update associated with a software application, the software update including at least one portion of code, the software application having a plurality of associated data structures, the method comprising:
    determining when at least a first data structure of the plurality of associated data structures is arranged to be directly affected by the at least one portion of code;
    generating a direct impact list that identifies the at least first data structure as being directly affected by the at least one portion of code when it is determined that the at least first data structure is arranged to be directly affected by the at least one portion of code;
    determining when at least a second data structure of the plurality of associated data structures is indirectly affected by the at least one portion of code;
    generating an indirect impact list that identifies the at least second data structure as being indirectly affected by the at least one portion of code when it is determined that the at least second data structure is indirectly affected by the at least one portion of code, wherein the direct impact list does not identify the at least second data structure, and the at least second data structure utilizes the first data structure identified in the first list;
    determining an amount of downtime for installing the at least one portion of code relative to the software application using the direct impact list and the indirect impact list
    determining when a third data structure of the plurality of associated data structures is arranged to be overwritten by the at least one portion of code, the third data structure being a customized data structure associated with the software application, wherein determining when the third data structure is arranged to be overwritten by the at least one portion of code includes comparing the direct impact list and the indirect impact list with the third data structure; and flagging the third data structure as being arranged to be overwritten by the at least one portion of code when it is determined that the third data structure is arranged to be overwritten by the at least one portion of code.

35. The method of claim 34 wherein determining when the at least second data structure of the plurality of associated data structures is indirectly affected by the at least one portion of code includes at least one of determining when the at least second data structure is dependent on the at least first data structure when it is determined that the at least first data structure is arranged to be directly affected by the at least one portion of code and determining when a navigation flow associated with the at least second data structure is affected by the at least one portion of code.

36. The method of claim 34 wherein the software update includes a second portion of code, the method comprising:
determining when at least a fourth data structure of the plurality of associated data structures is arranged to be directly affected by the second portion of code;
updating the direct impact list to identify the fourth data structure as being directly affected by the second portion of code when it is determined that the fourth data structure is arranged to be directly affected by the second portion of code;
determining when a fifth data structure of the plurality of associated data structures is indirectly affected by the second portion of code; and
updating the indirect impact list to identify the fourth fifth data structure as being indirectly affected by the second portion of code when it is determined that the fourth fifth data structure is indirectly affected by the second portion of code, wherein determining the amount of downtime to schedule for installing the at least one portion of code relative to the software application using the direct impact list and the indirect impact list includes determining the amount of downtime to schedule for installing both the at least one portion of code and the second portion of code.

37. The method of claim 34 comprising:
before performing the software update including the at least one portion of code, displaying the amount of downtime to a user; and
after displaying the amount of downtime, receiving input from the user to select a time for system to be offline to perform the software update.

38. The method of claim 34 comprising:
automatically scheduling a time period for the system to be offline based on the amount of downtime, wherein the time period is at least as long as the amount of downtime; and
displaying a notification of the time period to a user.

39. The method of claim 34 wherein the determining an amount of downtime comprises:
estimating an amount of time needed to recompile files affected by the software update.

* * * * *

UNITED STATES PATENT AND TRADEMARK OFFICE
CERTIFICATE OF CORRECTION

| | | |
|---|---|---|
| PATENT NO. | : 7,895,592 B2 | Page 1 of 1 |
| APPLICATION NO. | : 11/089665 | |
| DATED | : February 22, 2011 | |
| INVENTOR(S) | : Subramanian et al. | |

It is certified that error appears in the above-identified patent and that said Letters Patent is hereby corrected as shown below:

On cover page, in column 1, under item (75), "Inventors", line 2, delete "Sonny" and insert -- Sunny --, therefor.

In column 9, line 5, delete "JSPS," and insert -- JSPs, --, therefor.

In column 15, line 56, in Claim 20, delete "arrangement" and insert -- arrangement, --, therefor.

In column 16, line 50, in Claim 24, delete "application;" and insert -- application, --, therefor.

In column 18, line 58, in Claim 34, delete "list" and insert -- list; --, therefor.

In column 19, line 28, in Claim 36, after "the" delete "fourth".

In column 19, line 29, in Claim 36, after "second" insert -- portion --.

In column 20, line 1, in Claim 36, after "the" delete "fourth".

Signed and Sealed this
Eleventh Day of October, 2011

David J. Kappos
*Director of the United States Patent and Trademark Office*